US011388885B2

(12) United States Patent
Ochiai et al.

(10) Patent No.: US 11,388,885 B2
(45) Date of Patent: Jul. 19, 2022

(54) REARING CAGE UNIT AND REARING APPARATUS

(71) Applicants: MITSUBISHI HEAVY INDUSTRIES, LTD., Tokyo (JP); JAPAN AEROSPACE EXPLORATION AGENCY, Tokyo (JP)

(72) Inventors: Toshimasa Ochiai, Tokyo (JP); Makoto Ohira, Tokyo (JP); Yusuke Hagiwara, Tokyo (JP); Hiroaki Kodama, Tokyo (JP); Hirochika Murase, Tokyo (JP); Masaki Shirakawa, Tokyo (JP); Dai Shiba, Tokyo (JP); Hiroyasu Mizuno, Tokyo (JP); Akane Yumoto, Tokyo (JP)

(73) Assignees: MITSUBISHI HEAVY INDUSTRIES, LTD., Tokyo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 142 days.

(21) Appl. No.: 16/829,274

(22) Filed: Mar. 25, 2020

(65) Prior Publication Data
US 2020/0305385 A1 Oct. 1, 2020

(30) Foreign Application Priority Data
Mar. 29, 2019 (JP) .............................. JP2019-068491

(51) Int. Cl.
*A01K 1/015* (2006.01)
*A01K 1/01* (2006.01)
(Continued)

(52) U.S. Cl.
CPC .......... *A01K 1/0151* (2013.01); *A01K 1/0058* (2013.01); *A01K 1/01* (2013.01);
(Continued)

(58) Field of Classification Search
CPC ...... A01K 1/0151; A01K 1/0058; A01K 1/01; A01K 1/0157; A01K 1/031; A01K 1/10; A01K 1/105; A01K 5/02; A01K 7/02
See application file for complete search history.

(56) References Cited

U.S. PATENT DOCUMENTS 7,849,818 B2 * 12/2010 Matsuo ................ A01K 1/0107
119/166
8,291,866 B2 * 10/2012 Cauchy ................ A01K 1/0236
119/500

(Continued)

FOREIGN PATENT DOCUMENTS

CN 1659956 B * 6/2010 ............... A01K 1/03
JP 2002-17191 1/2002

*Primary Examiner* — Timothy D Collins
*Assistant Examiner* — Nicholas Leo Seneczko
(74) *Attorney, Agent, or Firm* — Wenderoth, Lind & Ponack, L.L.P.

(57) ABSTRACT

A rearing cage unit includes an animal residential area defined by a floor, a ceiling, and a wall; an excrement collection area adjacent to the animal residential area; and an excretion sheet in the excrement collection area to receive excrement of the animal. At least one of the floor and the wall is made of a material including resin, and has an excretion hole to allow the excrement in the animal residential area to be discharged to the excrement collection area, and the excretion hole has a size that prevents four feet of the animal from entering the excretion hole. The excretion sheet faces the excretion hole.

19 Claims, 11 Drawing Sheets

(51) Int. Cl.
*A01K 7/02* (2006.01)
*A01K 5/02* (2006.01)
*A01K 1/03* (2006.01)
*A01K 1/00* (2006.01)

(52) U.S. Cl.
CPC ............ *A01K 1/0157* (2013.01); *A01K 1/031* (2013.01); *A01K 5/02* (2013.01); *A01K 7/02* (2013.01)

(56) References Cited

U.S. PATENT DOCUMENTS

| | | | |
|---|---|---|---|
| 10,076,098 B2* | 9/2018 | Matsuo | A01K 1/0114 |
| 2005/0284405 A1* | 12/2005 | Pomakoy-Poole | A01K 1/0245 |
| | | | 119/497 |
| 2006/0048469 A1* | 3/2006 | MacLean | E03F 5/0402 |
| | | | 52/220.3 |
| 2010/0043717 A1* | 2/2010 | Walker | A01K 1/0114 |
| | | | 119/167 |
| 2015/0320009 A1* | 11/2015 | Sasano | A01K 1/0107 |
| | | | 119/161 |
| 2016/0066533 A1* | 3/2016 | Frigo, III | A01K 1/0103 |
| | | | 119/479 |
| 2016/0309677 A1* | 10/2016 | Termini | A01K 29/005 |
| 2016/0345537 A1* | 12/2016 | Tonin | A01K 1/0058 |
| 2017/0361950 A1* | 12/2017 | Dharmaraj | B64G 1/60 |
| 2017/0367294 A1* | 12/2017 | Takagi | A01K 1/0157 |
| 2018/0103607 A1* | 4/2018 | Coiro | A01K 1/0058 |
| 2018/0116169 A1* | 5/2018 | Conger | B01D 29/085 |
| 2018/0359989 A1* | 12/2018 | Hampel | A01K 1/01 |

* cited by examiner

REARING CAGE UNIT AND REARING APPARATUS

CROSS-REFERENCE TO RELATED APPLICATIONS

The present application claims priority to and incorporates by reference the entire contents of Japanese Patent Application No. 2019-068491 filed in Japan on Mar. 29, 2019.

FIELD

The present invention relates to a rearing cage unit and a rearing apparatus in which an animal is reared individually.

BACKGROUND

There is known a small-animal rearing case in which small mammal animals are reared (see Japanese Patent Application Laid-open No 2002-17191, for example). From the viewpoint of ensuring animal welfare and maximizing scientific significance and values, it is necessary to keep the rearing environment in the small-animal rearing case clean, and not to impose stress on the animals as much as possible. Therefore, having been practiced are installing/replacing bedding materials regularly, and providing a meshed floor to allow the excrement and the like to be removed by using the gravity.

However, according to Japanese Patent Application Laid-open No 2002-17191, there has been no rearing apparatus capable of keeping the rearing environment clean and not to impose stress on the animals in environments at least including the space environment. In addition, when a mesh floor is used, as disclosed in Japanese Patent Application Laid-open No 2002-17191, a metal is used as a material to suppress damages by being gnawed by the animals. In other words, the floor is often implemented as a wire mesh. However, because a wire mesh is highly heat conductive, the mesh gives the animals a sensation of cool touch, and this sensation gives a stress to the animal. Generally, to alleviate this stress, bedding materials such as paper or wood chips are used. However, under a microgravity, such bedding materials may fly around, and deteriorate the rearing environment.

SUMMARY OF THE INVENTION

Therefore, an object of the present invention is to provide a rearing cage unit and a rearing apparatus from which excrement and the like of animals can be removed appropriately in environments at least including the space environment, so that the animal welfare is ensured, and the scientific significance and values are maximized.

A rearing cage unit according to an aspect of the present invention is where an animal is reared individually in an environment at least including a space environment. The rearing cage unit includes an animal residential area that is defined by a floor, a ceiling, and a wall; an excrement collection area that is provided adjacently to the animal residential area; and an excretion sheet that is provided in the excrement collection area to receive excrement of the animal. At least one of the floor and the wall is made of a material including resin, and has an excretion hole that allows the excrement in the animal residential area to be discharged to the excrement collection area, and that has a size that prevents four feet of the animal from entering the excretion hole. The excretion sheet is provided facing the excretion hole.

With this structure, because excrement excreted by the animal can be guided into the excrement collection area via the excretion hole, the excrement can be removed appropriately. Furthermore, because at least one of the floor and the wall is made of a material including resin, the sensation of cool touch given to the animal can be alleviated, compared with when a metal is used. In this manner, the stress imposed on the animal can be alleviated, so that it is possible to ensure the animal welfare, and to maximize the scientific significance and values. Examples of the space environment includes a zero-gravity environment, a microgravity environment on a satellite orbit, or an artificial gravity environment created artificially. Furthermore, examples of the animal include not only a small animal such as a mouse but also a primate such as a marmoset. Examples of the small animals include those defined by Japan Small Animal Veterinary Association, such as a dog, a cat, a hamster, a rabbit, a ferret, a small bird, and a reptile.

Preferably, the floor is curved in a recessed shape toward the excrement collection area.

With this structure, because the floor is curved in a direction perpendicular to the centrifugal force, when a centrifugal force is applied in a direction from the ceiling toward the floor, the artificial gravity can be applied appropriately to the mouse moving on the floor.

Preferably, at least one of the floor and the wall is applied with a surface treatment for guiding the excrement in the animal residential area into the excrement collection area.

With this structure, the excrement such as urine in the animal residential area can be guided into the excrement collection area, and the excrement can be removed more suitably, so that the excrement does not stay in the animal residential area. The surface treatment may be a hydrophilic treatment for modifying the surface with a plasma treatment, or a hydrophilic treatment for roughing the surface by sandblasting or the like, for example, without limitation to any particular treatment.

It is preferable that the animal is a mouse, the excretion hole is a circular opening having a diameter of 5.0 millimeters±0.5 millimeters, the wall is a flat plate having a thickness of 1.0 millimeter to 2.5 millimeters, and the floor is a flat plate having a thickness of 2.0 millimeters±0.5 millimeters.

With this structure, when the animal is a mouse, because the size of the excretion hole can be set to an appropriate size, it is possible not only to remove the excrement suitably, but also to suitably prevent the four feet of the mouse from entering the excretion hole. Furthermore, when the animal is a mouse, because the thickness of the floor and the wall can be set appropriately, it is possible to suppress damages of the floor and the wall even when the floor and the wall are gnawed by the mouse. The excretion hole that is a circular opening may be a straight hole having a constant opening size in the axial direction that passes through the center of the opening, or may have a tapered shape where the opening becomes larger in size from the animal residential area toward the excrement collection area.

It is preferable that a maximum length inside the animal residential area is equal to or more than a recommended height, and a floor area of the floor is equal to or more than a recommended floor area, the recommended height is a height of a terrestrial residential area recommended for the animal that is terrestrially reared in plurality as a group, and the recommended floor area is a floor area of the terrestrial residential area recommended for the animal that is terrestrially reared in plurality as a group.

With this structure, even in environments at least including the space environment, it is possible to set the maximum length of the animal residential area to a height equal to or more than the recommended height. It is also possible to set the floor area of the floor to an area equal to or more than the recommended floor area. Therefore, the animal can do its daily activities easily, and the stress imposed on the animal can be alleviated. Hence, it is possible to ensure the animal welfare, and to maximize the scientific significance and values. When the animal residential area has a rectangular shape, the maximum length is, for example, a length connecting opposing corners of the rectangular shape. Furthermore, when the direction of the gravity is inconstant, the recommended height may be ensured where the animal residential area has the maximum length, and the recommended floor area may be ensured as total of the floor and the wall. With such a structure, even when the animal floats in environment at least including the space environment, four feet of the animal can be brought into contact with the floor or the wall easily, so that the animal can move suitably.

It is preferable that the rearing cage unit further includes a ventilation inlet that is provided to the ceiling of the animal residential area; a ventilation outlet that is provided to the excrement collection area; and a ventilation fan that is connected to the ventilation outlet, and the ventilation fan operates in such a manner that a volume of an airflow travelling from the ventilation inlet to the ventilation outlet is set to a volume by which the excrement in the excrement collection area is carried along the excretion sheet and removed.

With this structure, because it is possible not only to ventilate the animal residential area but also to remove the excrement by operating the ventilation fan, the structure of the apparatus can be simplified. Therefore, the apparatus can be reduced in size. The ventilation inlet and the ventilation outlet may also be provided with a particle filter. With such a configuration, the particle filter can serve to regulate the airflow. This regulation can reduce stagnation of the air inside the animal residential area, and promote movement of excrement or the like floating inside the animal residential area into the excrement collection area.

It is preferable that the rearing cage unit further includes a look-through window that is provided to the wall, and that allows an animal being reared in another rearing cage unit that is adjacent thereto to be looked at.

With this structure, even when the animal is reared in a rearing cage unit in which an animal is reared individually, it is possible to look at the animal being reared in another rearing cage unit, so that the stress of the animal can be alleviated.

It is preferable that the rearing cage unit further includes a feeder that is provided adjacently to the animal residential area with the wall interposed therebetween, and that is replaceable, and the wall has a feed opening through which food in the feeder is provided to the animal residential area, the feeder includes a food container in which the food is stored, a pushing member that pushes the food stored in the food container toward the feed opening of the wall, and a biasing member that applies a biasing force to the pushing member in a pushing direction of the food.

With this structure, by pushing the food toward the feed opening with the biasing member and the pushing member, the animal can be fed automatically. The food container may also be provided with a scale indicating the amount of remaining food.

It is preferable that the pushing direction is a circumferential direction about a shaft, the food container is provided extending from the feed opening in the circumferential direction, the pushing member is provided to the food container on a side opposite to where the feed opening is provided in the circumferential direction, in a manner rotatable about the shaft, and the biasing member is a rotating spring that is provided to the shaft to move the pushing member in the circumferential direction that is the pushing direction, about the shaft.

With this structure, because the food in the food container can be pushed toward the feed opening by moving the pushing member in the circumferential direction, the structure of the feeder can be reduced in size, and the space occupied by the feeder can also be reduced. The feed opening may be provided with bars for restricting the entry of the animal into the food container. Furthermore, these bars may also serve as a stopper for restricting the conveyance of the food to the external.

It is preferable that the rearing cage unit further includes a camera that captures an image of the animal residential area via an observation surface provided to the animal residential area; a fluid supplying unit that supplies washer fluid to the observation surface; and a wiper that wipes the washer fluid on the observation surface, and the fluid supplying unit has a supply channel through which the washer fluid is supplied, with an inner circumferential surface thereof applied with a surface treatment having hydrophobicity to the washer fluid.

With this structure, because a surface treatment is applied to the inner circumferential surface of the supply channel, it is possible to improve the drainage of the washer fluid.

It is preferable that the rearing cage unit further includes a water supplying unit that is provided in the animal residential area to supply water to the animal, the wall has a feed opening through which food is fed to the animal in the animal residential area, and the camera is provided at a position where the camera is able to capture an image of the feed opening and an image of the water supplying unit.

With this structure, it is possible to easily observe the food intake and the water intake by the animal.

It is preferable that the rearing cage unit further includes an environmental sensor that collects a measurement of an environment inside the animal residential area.

With this structure, it is possible to appropriately get grasp of the environment inside the animal residential area. Examples of the environmental sensor include a temperature sensor that measures the temperature in the animal residential area, a humidity sensor that measures the humidity in the animal residential area, a $CO_2$ sensor that measures the carbon dioxide concentration in the animal residential area, an $NH_3$ sensor that measures the ammonia concentration in the animal residential area, and a pressure sensor that measures the pressure in the animal residential area.

It is preferable that the rearing cage unit further includes a water replenisher that replenishes water in the animal residential area, and the water replenisher is attached removably to the wall that defines the animal residential area.

With this structure, by attaching the water replenisher to the wall, it is possible to replenish water for the animal, so that the mouse rearing environment can be maintained appropriately. If no water replenishment for the mouse is required, the water replenisher can be removed from the wall.

It is preferable that the water replenisher includes a replenisher main body that holds water gel inside, and that has an opening provided in a manner enabling an access to the water gel, and a sealing member that is provided between the replenisher main body and the wall, and that provides sealing between the replenisher main body and the wall to ensure air-tightness.

With this structure, by ensuring the air-tightness between the replenisher main body and the wall by providing sealing with the sealing member, the air-tightness of the mouse residential area can be ensured, so that it is possible to suppress water content evaporating from the water gel and escaping from the animal residential area to the outside, and to suppress drying of the water gel.

It is preferable that the opening has a size for preventing the water gel held inside the replenisher main body from overflowing to outside.

With this structure, it is possible to provide the water gel to the animal via the opening, while ensuring that the water gel is kept inside the replenisher main body, without overflowing out of the replenisher main body.

It is preferable that a direction of the opening changes depending on a position where the replenisher main body is attached to the wall.

With this structure, because the direction of the opening can be changed by changing the position to which the replenisher main body is attached, it is possible to adjust the opening in a manner appropriate for the animal.

A rearing cage unit according to another aspect of the present invention is where an animal is reared individually in an environment at least including a space environment. The rearing cage unit includes an animal residential area defined by a floor, a ceiling, and a wall. A maximum length inside the animal residential area is equal to or more than a recommended height. A floor area of the floor is equal to or more than a recommended floor area. The recommended height is a height of a terrestrial residential area recommended for the animal that is terrestrially reared in plurality as a group. The recommended floor area is a floor area of the terrestrial residential area recommended for the animal that is terrestrially reared in plurality as a group.

With this structure, even in the environments at least including the space environment, it is possible to set the maximum length to a height equal to or more than the recommended height in the animal residential area. It is also possible to set the floor area of the floor to an area equal to or more than the recommended floor area. Therefore, the animal can do its daily activities easily, and the stress imposed on the animal can be alleviated. Hence, it is possible to ensure the animal welfare, and to maximize the scientific significance and values.

A rearing cage unit according to still another aspect of the present invention is where an animal is reared individually in an environment at least including a space environment. The rearing cage unit includes an animal residential area that is defined by a floor, a ceiling, and a wall; an excrement collection area that is provided adjacently to the animal residential area with the floor interposed therebetween; an excretion sheet that is provided in the excrement collection area, and that receives excrement of the animal; a ventilation inlet that is provided to the ceiling of the animal residential area; a ventilation outlet that is provided to the excrement collection area; and a ventilation fan that is connected to the ventilation outlet. The floor has an excretion hole that allows the excrement in the animal residential area to be discharged to the excrement collection area, and that has a size that prevents four feet of the animal from entering the excretion hole. The excretion sheet is provided facing the excretion hole. The ventilation fan operates in such a manner that a volume of an airflow travelling from the ventilation inlet to the ventilation outlet is set to a volume by which the excrement in the excrement collection area is carried along the excretion sheet and removed.

With this structure, because it is possible not only to ventilate the animal residential area but also to remove the excrement by operating the ventilation fan, the structure of the apparatus can be simplified. Therefore, the apparatus can be reduced in size.

A rearing cage unit according to yet still another aspect of the present invention is where an animal is reared individually in an environment at least including a space environment. The rearing cage unit includes an animal residential area that is defined by a floor, a ceiling, and a wall; and a feeder that is provided adjacently to the animal residential area with the wall interposed therebetween, and that is replaceable. The wall has a feed opening through which food in the feeder is provided to the animal residential area. The feeder includes a food container in which the food is stored, a pushing member that pushes the food stored in the food container toward the feed opening of the wall, and a biasing member that applies a biasing force to the pushing member in a pushing direction of the food.

With this structure, the animal can be fed by pushing the food toward the feed opening.

A rearing cage unit according to yet still another aspect of the present invention is where an animal is reared individually in an environment at least including a space environment. The rearing cage includes an animal residential area that is defined by a floor, a ceiling, and a wall; a camera that captures an image of the animal residential area via an observation surface provided to the animal residential area; a fluid supplying unit that supplies washer fluid to the observation surface of the camera; and a wiper that wipes the washer fluid on the observation surface. The fluid supplying unit has a supply channel through which the washer fluid is supplied, with an inner circumferential surface thereof applied with a surface treatment having hydrophobicity to the washer fluid.

With this structure, because the surface treatment is applied on the inner circumferential surface of the supply channel, it is possible to improve the drainage of the washer fluid.

A rearing cage unit according to yet still another aspect of the present invention is where an animal is reared individually in an environment at least including a space environment. The rearing cage unit includes an animal residential area that is defined by a floor, a ceiling, and a wall; and a water replenisher that replenishes water in the animal residential area. The water replenisher is attached removably to the wall that defines the animal residential area.

With this structure, by attaching the water replenisher to the wall, it is possible to replenish the water in the animal residential area. If no water replenishment in the animal residential area is required, the water replenisher can be removed from the wall.

A rearing apparatus according to yet still another aspect of the present invention includes the rearing cage unit; a gravity imposing apparatus that imposes an artificial gravity to the rearing cage unit; and an interface unit that connects the rearing cage unit to the gravity imposing apparatus, and to which the rearing cage unit is attached in plurality.

With this structure, it is possible to rear the animal with the artificial gravity imposed on the rearing cage unit.

It is preferable that the rearing cage units are provided side by side in a circumferential direction about a rotational shaft, and two of the rearing cage units that are adjacent in the circumferential direction are configured to be axially symmetric to each other.

With this structure, by providing a look-through window through which the animals can look at each other, on each of the adjacent surfaces of the two rearing cages unit, the animals reared in the two rearing cage units can recognize each other.

DESCRIPTION OF EMBODIMENTS

Some embodiments of the present invention will now be explained in detail with reference to some drawings. These embodiments are, however, not intended to limit the scope of the present invention in any way. Furthermore, the elements described below in the embodiments include those that are easily replaceable by those skilled in the art, or those that are substantially the same. Furthermore, the element described below may be combined as appropriate, and when a plurality of embodiments are included, such embodiments may also be combined.

First Embodiment

A rearing apparatus 10 according to a first embodiment is an apparatus in which an animal is reared individually, in environments at least including the space environment. The space environments herein are those including a zero-gravity environment, a microgravity environment on a satellite orbit, or an artificial gravity environment created artificially, and may be any environment as long as the environment is an environment of the outer space. The environment may also include a terrestrial environment as well the space environment. An example of the terrestrial environment includes the terrestrial gravity environment. In the first embodiment, a mouse is used as an example of the animal. Explained in the first embodiment is an example of a mouse, but the animal may also be a small animal or a primate such as a marmoset. Examples of the small animal includes a dog, a cat, a hamster, a rabbit, a ferret, a small bird, and a reptile, in addition to a mouse.

Figure 1:
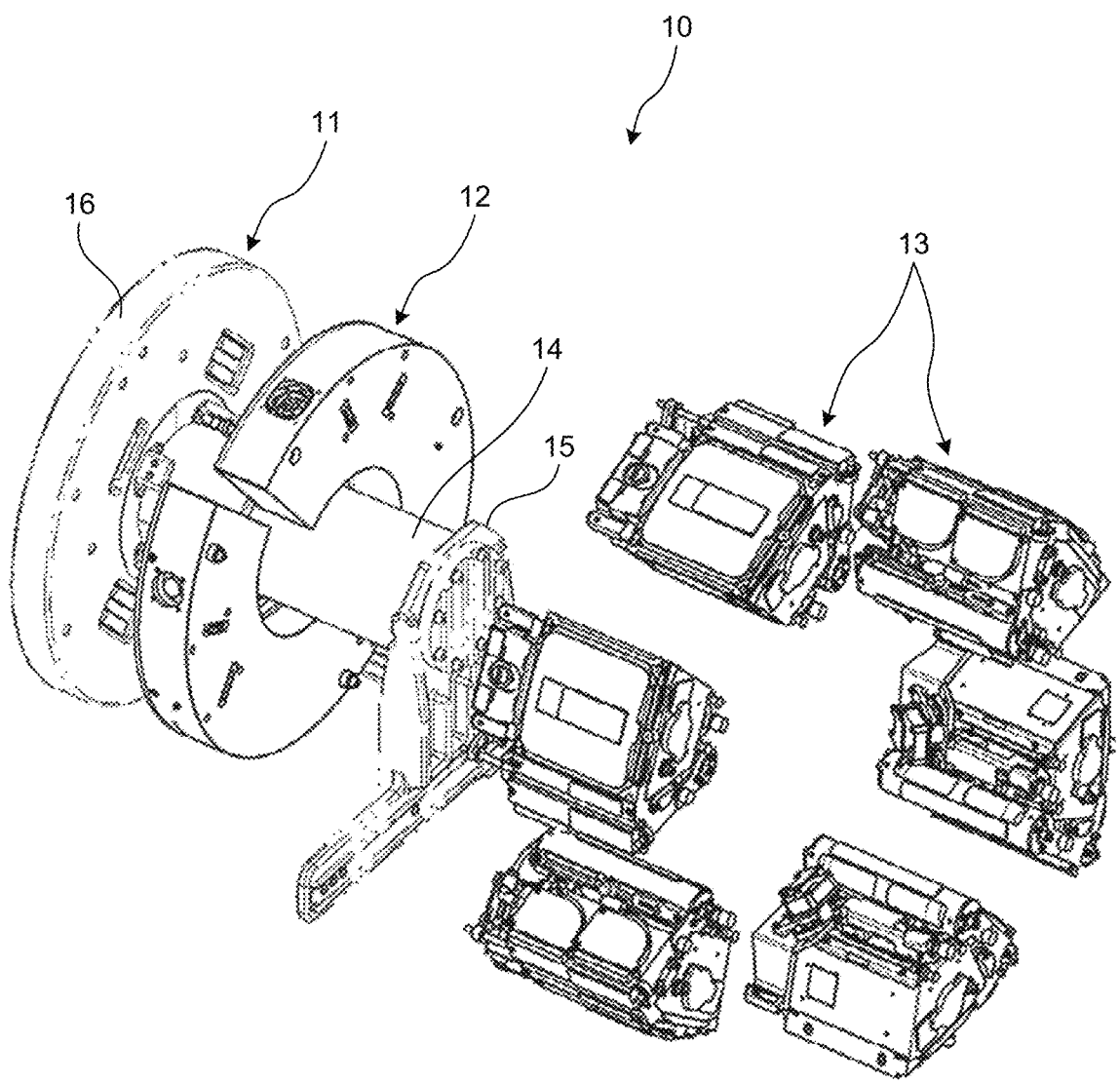
FIG. 1 is a perspective view related to a rearing apparatus according to a first embodiment.
Figure 2:
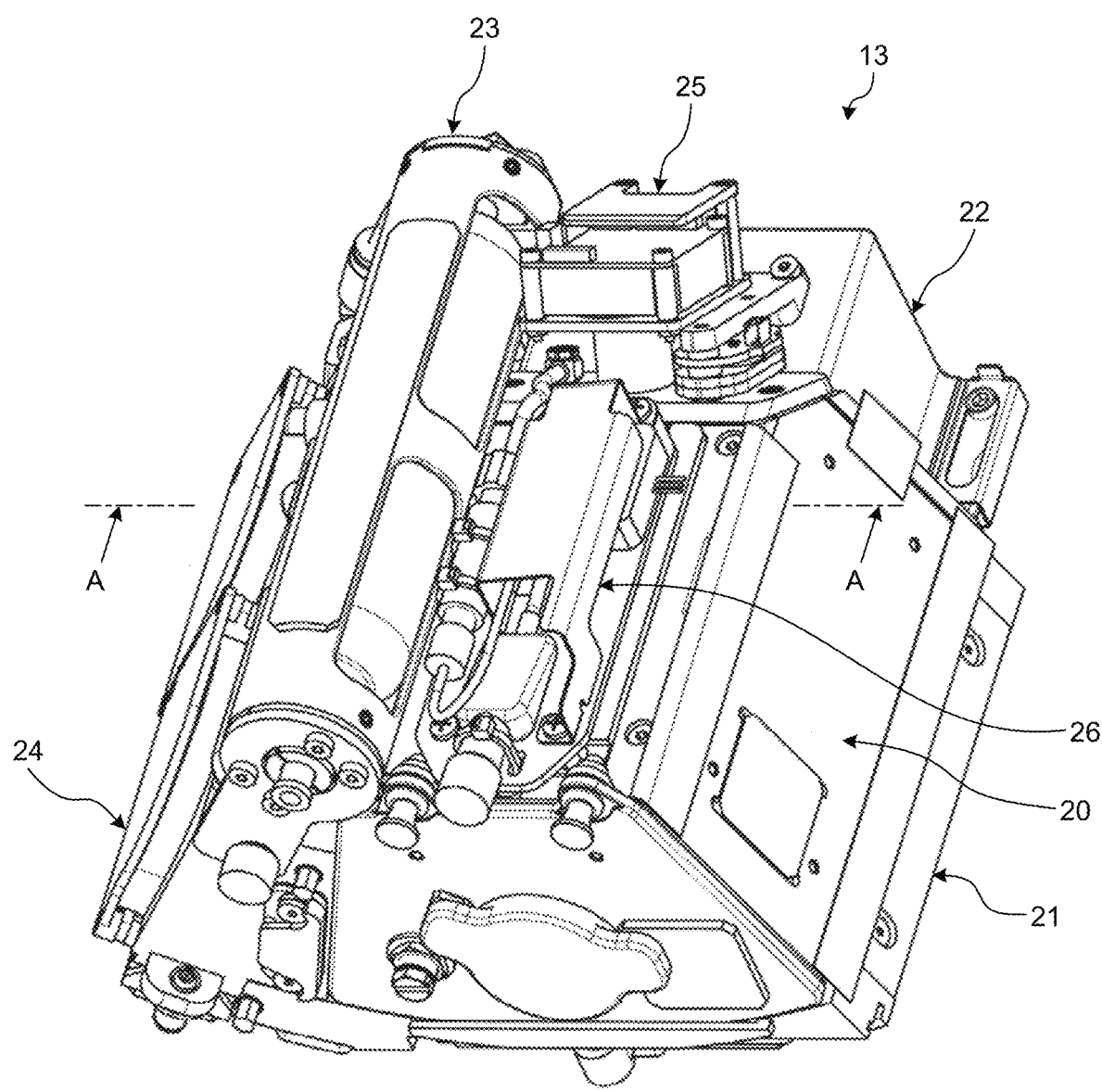
FIG. 2 is a perspective view of a rearing cage unit included in the rearing apparatus according to the first embodiment, in a view looking down upon a ceiling of the rearing cage unit.
Figure 3:
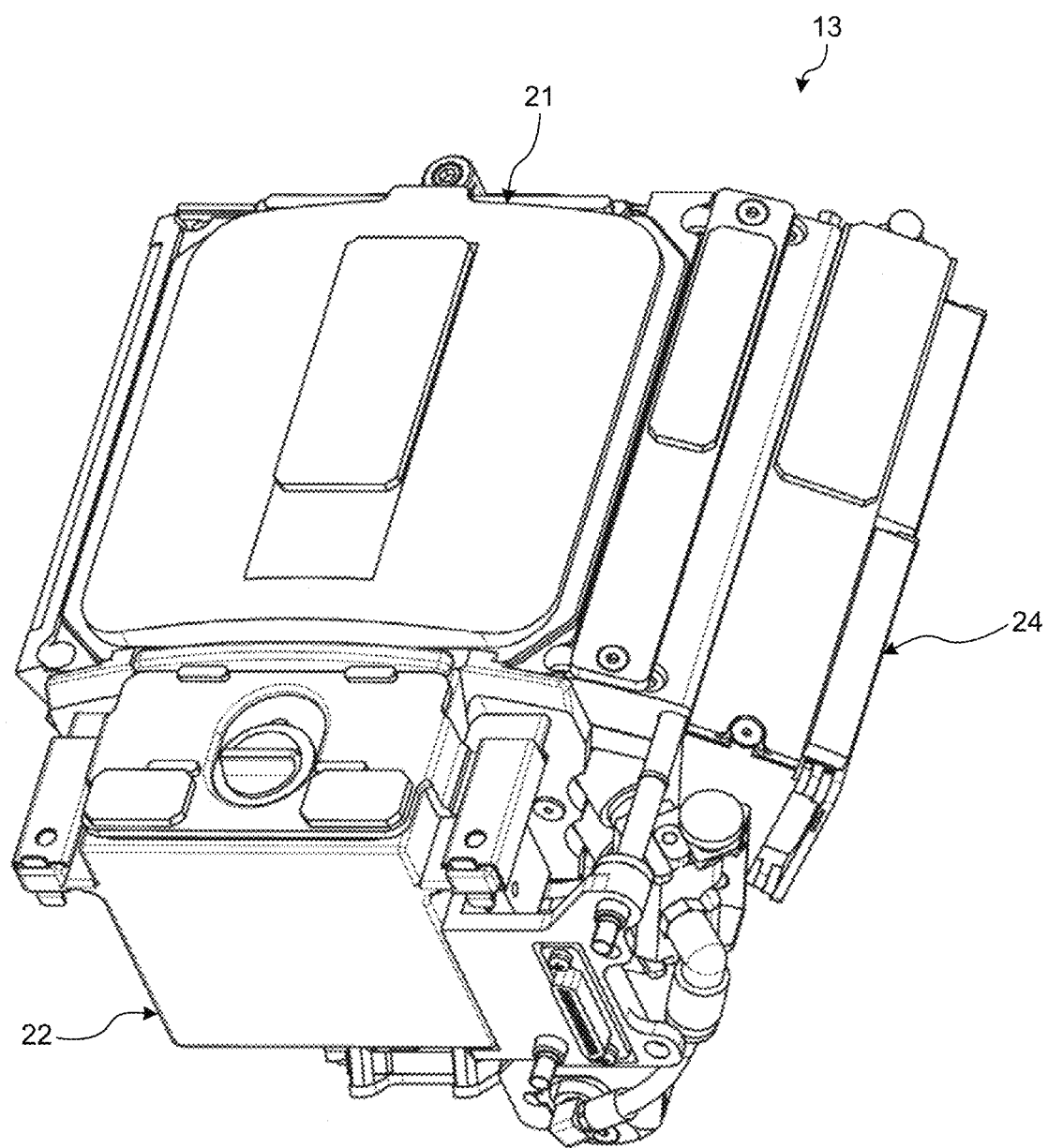
FIG. 3 is a perspective view of the rearing cage unit included in the rearing apparatus according to the first embodiment, in a view looking up to a floor of the rearing cage unit.
Figure 4:
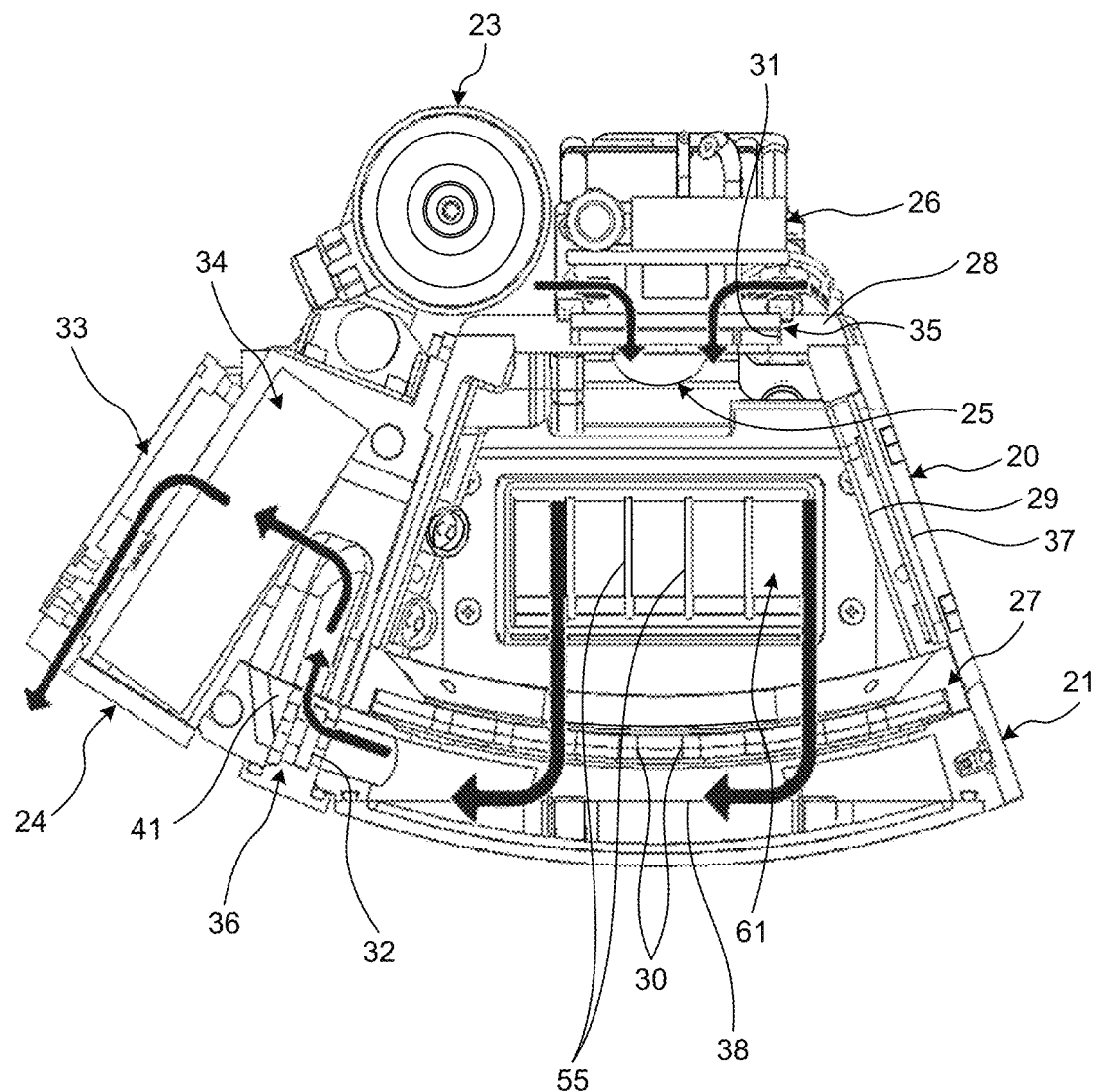
FIG. 4 is a cross-sectional view of the rearing cage unit included in the rearing apparatus according to the first embodiment.
Figure 5:
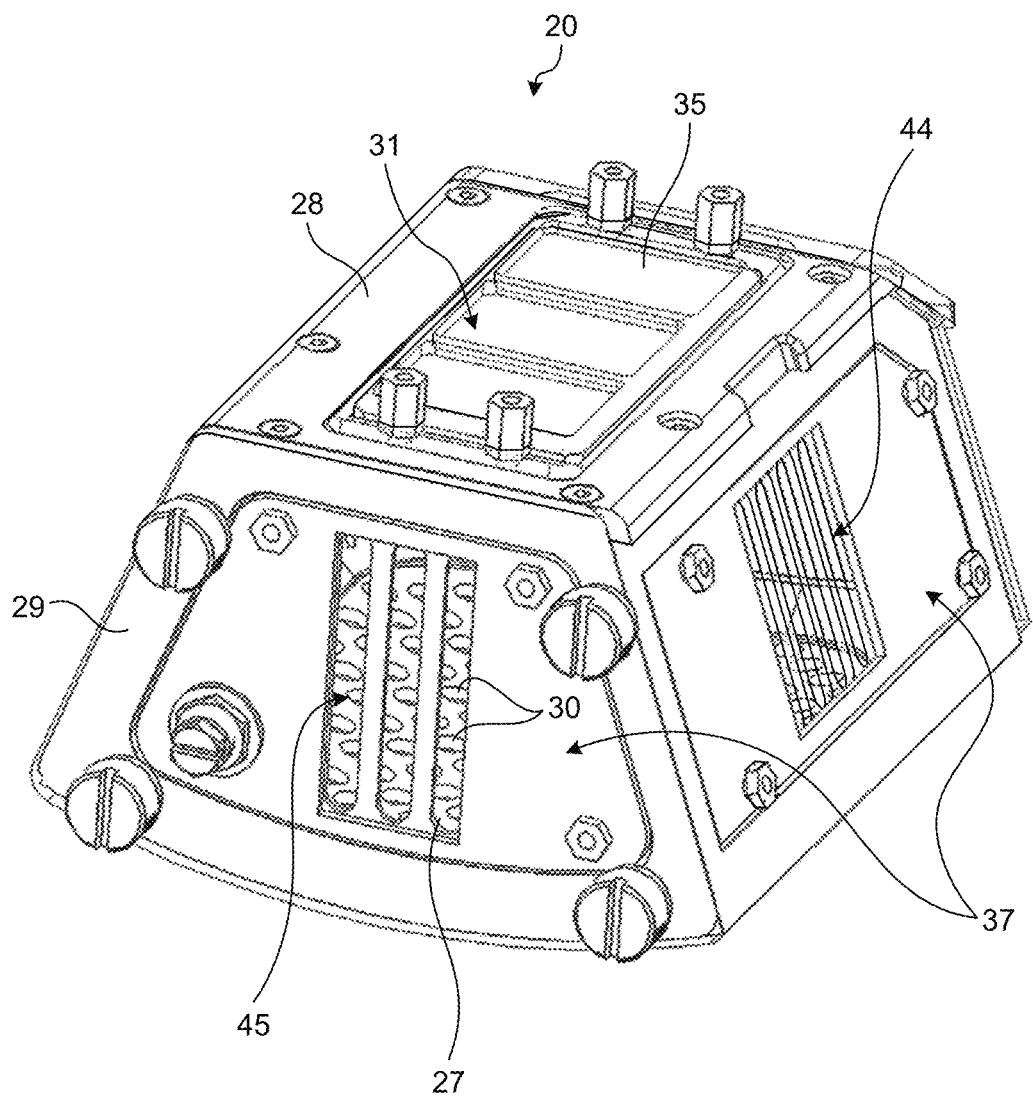
FIG. 5 is a perspective view related to an animal residential area in the rearing cage unit according to the first embodiment.
Figure 6:
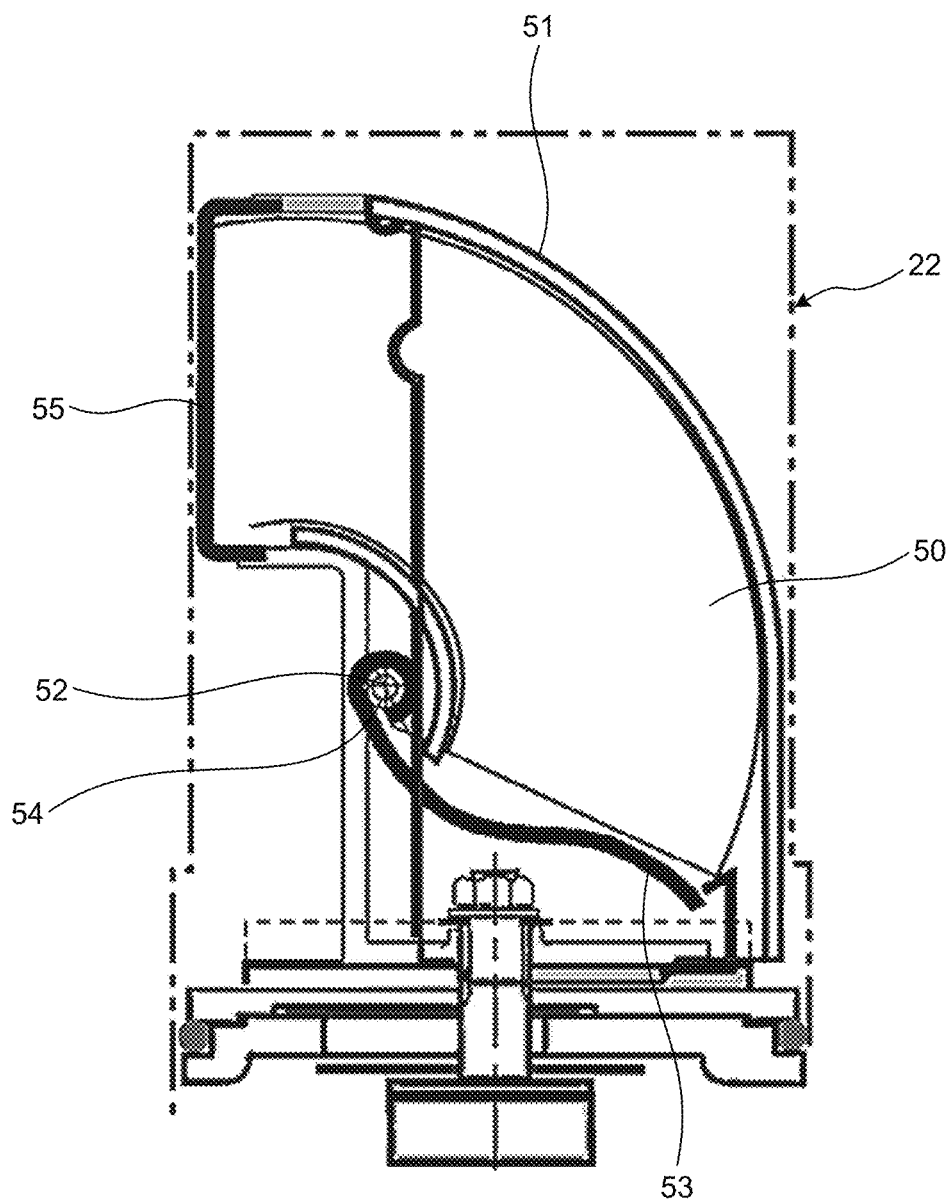
FIG. 6 is a cross-sectional view of a feeder according to the first embodiment.
Figure 7:
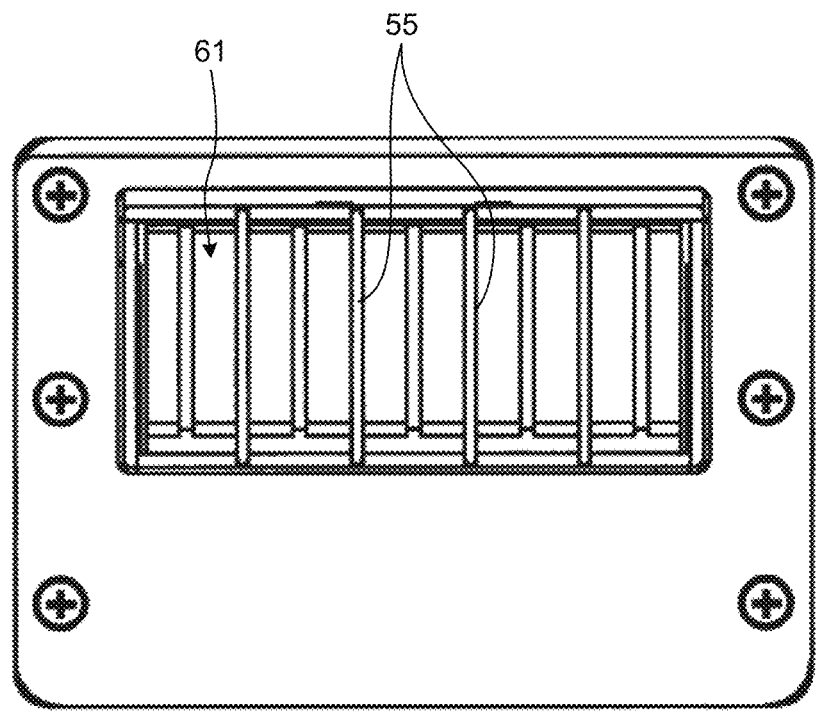
FIG. 7 is a schematic illustrating bars provided to the feeder according to the first embodiment.
Figure 8:
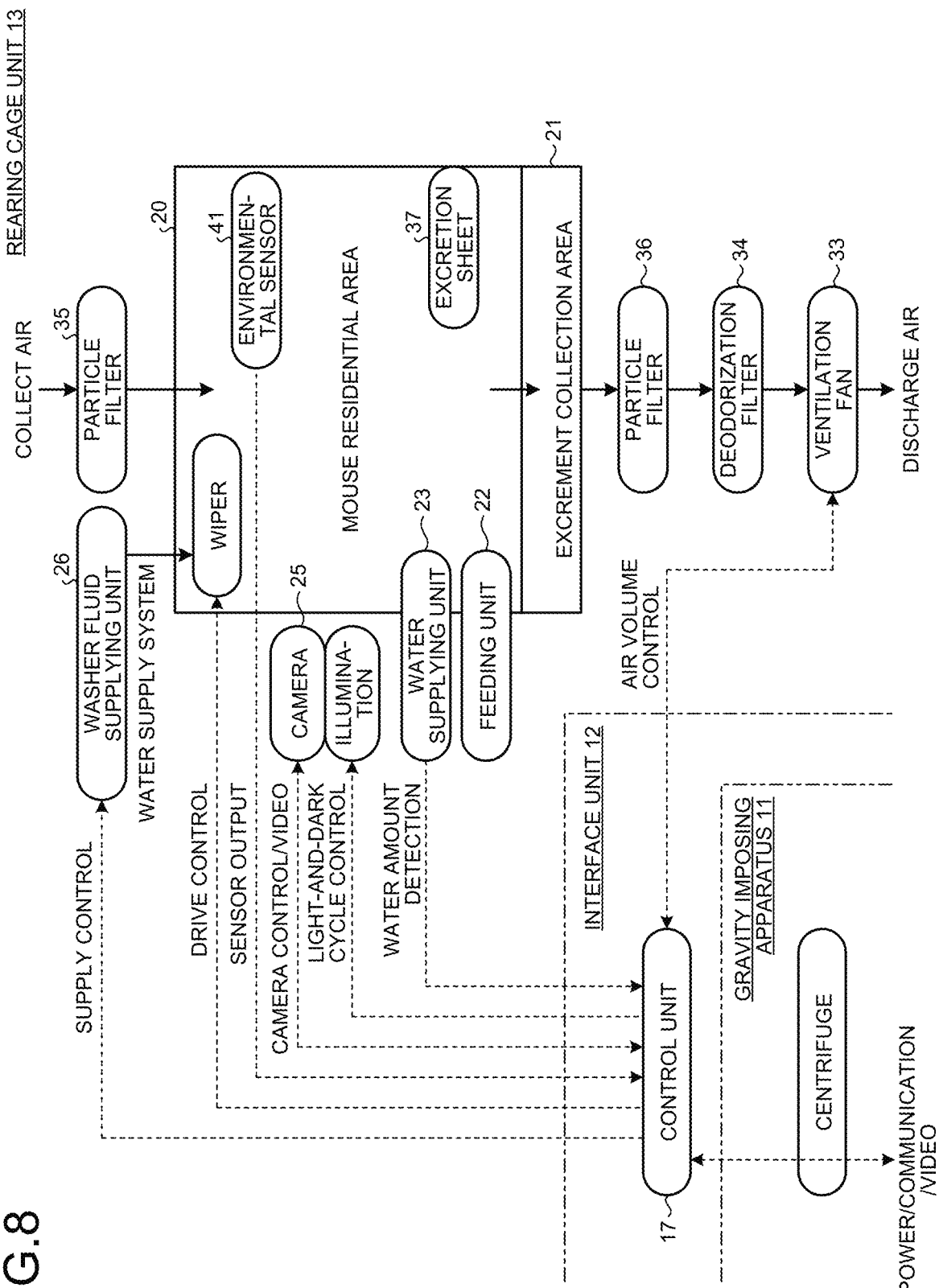
FIG. 8 is a block diagram illustrating the rearing apparatus according to the first embodiment.

FIG. 1 is a perspective view related to a rearing apparatus according to the first embodiment. FIG. 2 is a perspective view of a rearing cage unit included in the rearing apparatus according to the first embodiment, in a view looking down upon a ceiling of the rearing cage unit. FIG. 3 is a perspective view of the rearing cage unit included in the rearing apparatus according to the first embodiment, in a view looking up to a floor of the rearing cage unit. FIG. 4 is a cross-sectional view of the rearing cage unit included in the rearing apparatus according to the first embodiment. FIG. 5 is a perspective view related to an animal residential area in the rearing cage unit according to the first embodiment. FIG. 6 is a cross-sectional view of a feeder according to the first embodiment. FIG. 7 is a schematic illustrating bars provided to the feeder according to the first embodiment. FIG. 8 is a block diagram illustrating the rearing apparatus according to the first embodiment.

As illustrated in FIG. 1, the rearing apparatus 10 includes a gravity imposing apparatus 11, an interface unit 12, and a plurality of rearing cage units 13.

The gravity imposing apparatus 11 imposes an artificial gravity onto the rearing cage units 13 by applying a centrifugal force to the rearing cage units 13 attached to the gravity imposing apparatus 11. The gravity imposing apparatus 11 is what is called a centrifuge. As illustrated in FIG. 1, the gravity imposing apparatus 11 includes a rotational shaft 14, a shaft support 15 that supports the rotational shaft 14 in a rotatable manner, and a flange 16 that is provided in a manner protruding in the radial direction of the rotational shaft 14.

The gravity imposing apparatus 11 causes a driving source not illustrated to rotate the rotational shaft 14, with the shaft support 15 rotatably supporting the rotational shaft 14. By causing the rotational shaft 14 to rotate, the gravity imposing apparatus 11 rotates the flange 16 provided integrally to the rotational shaft 14, and generates a centrifugal force in the radial direction. The flange 16 is attached in a manner facing the interface unit 12 in the axial direction.

The interface unit 12 is dividable into two parts, and can be attached to the flange 16 by coming face to face with each other in the radial direction of the rotational shaft 14. The interface unit 12 forms a ring-like shape when the parts having a semi-ring-like shape are attached to the flange 16. To the interface unit 12, the rearing cage units 13 are attached. In other words, the interface unit 12 serves to connect the gravity imposing apparatus 11 to the rearing cage units 13. The interface unit 12 is configured in such a manner that the rearing cage units 13 can be attached side by side along the circumferential direction of the rotational shaft 14.

A control unit 17 (see FIG. 8) for controlling the rearing cage units 13 is also provided to the interface unit 12. The control unit 17 can control the rearing cage units 13 that are attached to the interface unit 12.

The rearing cage units 13 are attached to a surface of the interface unit 12, the surface facing the opposite side of the gravity imposing apparatus 11, in the axial direction of the rotational shaft 14. The rearing cage units 13 are arranged side by side in the circumferential direction of the rotational shaft 14. In the first embodiment, six rearing cage units 13 are provided, as an example. The two rearing cage units 13 that are adjacent to each other in the circumferential direction of the rotational shaft 14 are configured to be axially symmetric to each other, with respect to the rotational shaft 14 as the axis.

The rearing apparatus 10 described above applies a centrifugal force to the rearing cage units 13 by causing the gravity imposing apparatus 11 to rotate the rearing cage units 13 attached to the gravity imposing apparatus 11 with the interface unit 12 interposed therebetween. In this manner, even in the space environment, the rearing apparatus 10 allows the mice to be reared under an artificial gravity imposed thereto.

The rearing cage unit 13 will now be explained with reference to FIGS. 2 to 4. The rearing cage unit 13 is an independent cage unit in which each mouse is reared individually. The rearing cage unit 13 includes a mouse residential area 20, an excrement collection area 21, a feeding unit 22, a water supplying unit 23, a ventilation unit 24, a camera 25, a washer fluid supplying unit 26, and a wiper not illustrated.

As illustrated in FIG. 2, the mouse residential area 20 occupies a dominant part of the rearing cage unit 13. As illustrated in FIG. 5, the mouse residential area 20 is defined by a floor 27, a ceiling 28, and a wall 29. The mouse residential area 20 is a room (chamber) in which the mouse resides. The mouse residential area 20 has an internal space large enough to alleviate the stress given to the animal. A recommended size of a mouse residential area for terrestrially reared mice is stipulated in "Standards relating to the Care and Keeping and Reducing Pain of Laboratory Animals" (edited by the Japanese Ministry of the Environment), for example. Specifically, looking at Table 1 in Appendix appended to the Standards, the recommended floor area of the mouse residential area recommended for mice that are terrestrially reared as a group is stipulated as 96.7 cm$^2$, and the recommended height is stipulated as 12.7 centimeters. In the first embodiment, the maximum length of the mouse residential area 20 of the rearing cage unit 13 used in the space environment is set to a length equal to or more than this recommended height, and the area of the floor 27 is set equal to or more than the recommended floor area. The mouse residential area 20 has a curved rectangular shape, curved along the circumferential direction of the rotational shaft 14, and the maximum length inside the area is the length connecting the opposing corners of this rectangular shape. In other words, the maximum length inside the area is a length connecting a predetermined one of the four corners of one of a pair of the walls 29 facing each other, to another predetermined one of the four corners of the other wall 29 at a position opposite to the predetermined corner of the one wall 29. Specifically, the maximum length inside the area is approximately 13.6 centimeters. The floor area of the mouse residential area 20 is approximately 102 cm$^2$.

As illustrated in FIG. 5, the floor 27 has a flat plate-like shape curved in the circumferential direction of the rotational shaft 14. In other words, the floor 27 is curved in a recessed shape toward the excrement collection area 21. The floor 27 is made of a material including resin. Specifically, the floor 27 is made of polycarbonate (PC). The floor 27 is provided with a plurality of excretion holes 30, in a manner penetrating the floor 27, through which the excrement in the mouse residential area 20 is discharged into the excrement collection area 21. The excretion holes 30 are arranged in a staggered pattern, for example. The pattern in which the excretion holes 30 are arranged is not limited to any pattern, and may also be a grid-like pattern, for example. The excretion hole 30 is a circular opening, and has a size allowing the excrement to pass therethrough, but suitably preventing the four feet of the mouse from entering the excretion hole 30. The excretion hole 30 is a circular opening having a diameter of 5.0 millimeters±0.5 millimeters, and, specifically, is a circular opening having a diameter of 5 millimeters. In the first embodiment, the excretion hole 30 may be a straight hole having a constant opening size in the axial direction passing through the center of the opening, or may have a tapered shape where the opening becomes larger in size from the mouse residential area 20 toward the excrement collection area 21. Furthermore, in the first embodiment, the excretion hole 30 is explained to be a circular opening, but the shape of the opening is not limited to any particular shape, and may be a rectangular or triangular shape. Furthermore, the floor 27 has a thickness of 2.0 millimeters±0.5 millimeters (the length in the penetrating direction of the excretion hole 30). In the first embodiment, the thickness is 2 millimeters. Therefore, the floor 27 has a thickness enough to support the weight of the mouse even when the artificial gravity is imposed on the mouse, and has a thickness capable of suppressing damage even when the floor 27 is gnawed by the mouse.

The area of the ceiling 28 is smaller than that of the floor 27, and the floor 27 and the ceiling 28 are disposed in a manner facing each other in the radial direction of the rotational shaft 14. In other words, the ceiling 28 is disposed on an inner side in the radial direction, and the floor 27 is disposed on an outer side in the radial direction. The ceiling 28 is provided with a ventilation inlet 31 for providing ventilation to the mouse residential area 20.

The wall 29 includes two walls 29 facing each other in the axial direction of the rotational shaft 14, and another two walls 29 facing each other in the circumferential direction of the rotational shaft 14. The walls 29 are made of a material including resin. Specifically, the walls 29 are made of PC, in the same manner as the floor 27. The walls 29 are provided with a plurality of excretion holes, not illustrated, in a manner penetrating the walls 29, through which the excrement is discharged outside the mouse residential area 20. Because the excretion holes provided to the walls 29 are the same as the excretion holes 30 provided to the floor 27, explanations thereof will be omitted. One of the two walls 29 that face each other in the circumferential direction of the rotational shaft 14 is provided with a look-through window 44 for enabling the mouse to look at the mouse being reared in another rearing cage unit 13 adjacent thereto in the circumferential direction. This look-through window 44 is provided in a manner facing the look-through window 44 provided to the other adjacent rearing cage unit 13. One of the two walls 29 facing each other in the axial direction of the rotational shaft 14 is provided with an observation window 45 for observing the mouse in the mouse residential area 20. The thickness of the walls 29 (the length in the penetrating direction of the excretion holes) is 1.0 millimeter to 2.5 millimeters, and, in the first embodiment, the thickness is 1 millimeter, as an example, and is smaller than that of the floor 27. Although the walls 29 are thinner than the floor 27, the walls 29 have a thickness enough to suppress damages even when gnawed by the mouse. In other words, the thickness of the walls 29 can be set smaller than that of the floor 27, because it is not necessary to consider the capacity for supporting the weight of the mouse when the artificial gravity is imposed.

The other one of the two walls 29 facing each other in the axial direction of the rotational shaft 14, that is, the wall 29 on the opposite side of the wall 29 having the observation window 45, is provided with a feed opening 61 (see FIGS. 4 and 7) for feeding the mouse in the mouse residential area 20.

To the floor surface of the floor 27 and to the wall surface of the walls 29, a surface treatment for guiding the excrement in the mouse residential area 20 to the external is applied. The surface treatment is a hydrophilic treatment for modifying the surface using plasma, for example. The surface treatment is not limited to the particular example of the plasma hydrophilic treatment, and may also be a hydrophilic treatment for roughing the surface by sandblasting or the like.

An excretion sheet 37 for receiving the excrement discharged via the walls 29 is provided on the outer side of the walls 29. The excretion sheet 37 is what is called absorbent paper, and captures the excrement such as urine. The excretion sheet 37 has openings at positions facing the look-through window 44 and the observation window 45.

The excrement collection area 21 will now be explained with reference to FIG. 4. The excrement collection area 21 is provided on the outer side of the mouse residential area 20 in the radial direction of the rotational shaft 14. Therefore, the excrement collection area 21 is disposed adjacently to the mouse residential area 20 with the floor 27 interposed therebetween. The excrement collection area 21 is a space that is curved in the circumferential direction of the rotational shaft 14. The excrement collection area 21 is communicated with the mouse residential area 20 via the excretion holes 30. The excrement collection area 21 has an excretion sheet 38 at the position facing the excretion holes 30. Because the excretion sheet 38 is the same as the excretion sheet 37, explanations thereof will be omitted. The surfaces of the excretion sheet 37 and of the excretion sheet 38 are provided with a photocatalyst, and applied with an antibacterial metal via thermal spraying, and therefore, these surfaces are antibacterial, and have a deodorizing function.

The excrement collection area 21 has a ventilation outlet 32 for providing ventilation. The ventilation outlet 32 is provided on one side of the excrement collection area 21 in the circumferential direction of the rotational shaft 14. Installed near this ventilation outlet 32 is an environmental sensor 41 for collecting measurements related to the environment of the mouse residential area 20. The environmental sensor 41 measures the temperature and the humidity of the atmosphere inside of the mouse residential area 20, for example. The environmental sensor 41 may also include sensors such as a $CO_2$ sensor that measures the carbon dioxide concentration in the mouse residential area 20, an $NH_3$ sensor that measures the ammonia concentration in the mouse residential area 20, and a pressure sensor that measures the pressure in the mouse residential area 20. The environmental sensor 41 is electrically connected to the control unit 17 included in the interface unit 12, and outputs the measurement results to the control unit 17.

As illustrated in FIGS. 2 and 3, the feeding unit 22 is provided adjacently to the mouse residential area 20 and the excrement collection area 21 in the axial direction of the rotational shaft 14. This feeding unit 22 is removable from the mouse residential area 20, and is replaceable. As illustrated in FIG. 6, the feeding unit 22 includes a food container 51 in which food 50 is stored, a shaft 52, a pushing plate 53, and a rotating spring 54. The feeding unit 22 pushes the food 50 in a pushing direction that is the circumferential direction of the shaft 52, to push the food 50 to the feed opening 61 provided on the wall 29 of the mouse residential area 20.

The food container 51 is provided in a manner extending from the feed opening 61 in the circumferential direction of the shaft 52, and stores therein the food 50. The pushing plate 53 is provided on an end of the food container 51 in the circumferential direction of the shaft 52, on the side opposite to where the feed opening 61 is provided. The food 50 is a chunk having a shape that is complementary to the internal shape of the food container 51, and having a fan-like shape, viewing in a direction of the shaft 52. On the outer surface of the food container 51, a scale, not illustrated, indicating the amount of remaining food is provided.

The pushing plate 53 is a member for pushing the food 50 stored in the food container 51 toward the feed opening 61. The pushing plate 53 is a plate member having a protruding curved shape on the part that is brought into contact with the food 50, and having one end thereof rotatably mounted on the shaft 52. The pushing plate 53 pushes one end of the food 50 on the side opposite to the side facing the feed opening 61.

The rotating spring 54 is mounted on the shaft 52, and applies a biasing force to the pushing plate 53 toward the feed opening 61 in the circumferential direction of the shaft 52.

In such a feeding unit 22, the food 50 stored in the food container 51 receives a biasing force applied by the rotating spring 54 to the pushing plate 53 abutting against the end of the food 50, in the circumferential direction of the shaft 52, and is caused to move in the circumferential direction of the shaft 52 and pushed toward the feed opening 61. On the feed opening 61, bars 55 for restricting entry of the mouse are provided. The bars 55 form a vertical lattice fence, and the thickness of each bar 55 is 1 millimeter or so, and the pitch between the bars 55 is 9 millimeters or so. Therefore, the bars 55 also serve as a stopper for restricting conveyance of the food to the external.

As illustrated in FIG. 2, the water supplying unit 23 is provided on the side of the ceiling 28 of the mouse residential area 20. The water supplying unit 23 has a water feed port via which the water is supplied, and is provided on the side of the wall 29 where the feed opening 61 is provided to the mouse residential area 20. In other words, the water feed port is provided near the feed opening 61.

As illustrated in FIG. 4, the ventilation unit 24 includes the ventilation inlet 31 and the ventilation outlet 32 described above, a ventilation fan 33, and a deodorization filter 34. The ventilation inlet 31 is provided with a particle filter 35 for cleaning the incoming air, and, in the same manner, the ventilation outlet 32 is provided with a particle filter 36 for cleaning the outgoing air. The ventilation fan 33 is connected to the ventilation outlet 32. The ventilation fan 33 is electrically connected to the control unit 17 included in the interface unit 12, and the control unit 17 controls the operation of the ventilation fan 33. The deodorization filter 34 is provided to the air passage between the ventilation outlet 32 and the ventilation fan 33, and deodorizes the air discharged from the ventilation outlet 32.

In the ventilation unit 24 described above, when the ventilation fan 33 operates, the air is collected via the ventilation inlet 31. At this time, the collected air is cleaned by passing through the particle filter 35, and the airflow is regulated by the particle filter 35. The air collected through the ventilation inlet 31 passes through the mouse residential area 20, and goes into the excrement collection area 21 via the excretion holes 30. The air having reached the excrement collection area 21 travels to the ventilation outlet 32 in the excrement collection area 21. The air discharged from the ventilation outlet 32 is cleaned by passing through the particle filter 36, deodorized by passing through the deodorization filter 34, and discharged by the ventilation fan 33. At this time, the ventilation fan 33 operates in such a manner that the airflow travelling from the ventilation inlet 31 to the ventilation outlet 32 has a volume allowing the excrement in the excrement collection area 21 to be carried along and removed from the excretion sheet 38. In this manner, the ventilation unit 24 not only ventilates the air inside the mouse residential area 20, but also removes the excrement in the excrement collection area 21.

As illustrated in FIG. 2, the camera 25 is provided on the side of the ceiling 28 of the mouse residential area 20 near the side of the feeding unit 22. The camera 25 captures an image of the inside of the mouse residential area 20, via a camera observation surface provided on the mouse residential area 20. The camera 25 is provided at a position where an image of the feed opening 61 and the water feed port can be captured simultaneously. An illumination is provided near the camera 25, and illuminates the inside of the mouse residential area 20. The illumination substitutes the light-and-dark cycle of the daytime and the nighttime, by changing the luminance inside the mouse residential area 20. The camera 25 and the illumination are electrically connected to the control unit 17 included in the interface unit 12, and the control unit 17 controls the operations of the camera 25 and the illumination. The camera 25 is also capable of capturing the image during the dark period using infrared spectroscopy (IR).

As illustrated in FIG. 2, the washer fluid supplying unit 26 is provided on the ceiling 28 of the mouse residential area 20. The washer fluid supplying unit 26 supplies washer fluid to the camera observation surface of the mouse residential area 20. The washer fluid supplying unit 26 is provided with a supply channel for supplying washer fluid to the camera observation surface, and a hydrophobic surface treatment having hydrophobicity to the washer fluid is applied to the inner circumferential surface of the supply channel. The surface treatment may be a plasma treatment, in the same manner as the treatment applied to the floor surface of the floor 27 and the wall surface of the wall 29, or may also be sandblasting, without limitation to a particular treatment. The washer fluid supplying unit 26 is electrically connected to the control unit 17 included in the interface unit 12, and the control unit 17 controls the operation of the washer fluid supplying unit 26.

The wiper is an apparatus for wiping the camera observation surface having received the supply of washer fluid. The wiper is electrically connected to the control unit 17 included in the interface unit 12, and the control unit 17 controls the operation of the wiper.

The control unit 17 controls the units included in the rearing cage unit 13. As illustrated in FIG. 8, the control unit 17 controls the volume of the airflow in the mouse residential area 20 by controlling the operation of the ventilation fan 33. The control unit 17 also acquires a measurement of the amount of water from a water amount detection sensor provided to the water supplying unit 23. The control unit 17 acquire a video capturing an image of the inside of the mouse residential area 20 by controlling the operation of the camera 25. The control unit 17 controls the luminance inside the mouse residential area 20 by controlling the operation of the illumination. The control unit 17 acquires environment information such as the temperature, the humidity, and the like inside the mouse residential area 20, by acquiring measurement results from the environmental sensor 41. The control unit 17 cleans the camera observation surface by controlling the operations of the washer fluid supplying unit 26 and the wiper.

As described above, according to the first embodiment, because the excrement excreted by the mouse in the mouse residential area 20 can be guided into the excrement collection area 21 via the excretion holes 30, the excrement can be removed appropriately. Furthermore, because the floor 27 and the wall 29 are made of a material including resin, the sensation of cool touch given to the mouse can be alleviated, compared with when a metal is used. Therefore, the stress imposed on the mouse can be alleviated, so that it is possible to ensure the animal welfare, and to maximize the scientific significance and values.

Furthermore, according to the first embodiment, because a surface treatment is applied to the floor 27 and the wall 29, excrement such as urine is guided into the excrement collection area 21 so that the excrement does not stay inside the mouse residential area 20, and excrement can be removed more suitably.

Furthermore, according to the first embodiment, because the size of the excretion hole 30 can be set to a size appropriate for the mouse, it is possible not only to remove the excrement suitably, but also to suitably prevent the four feet of the mouse from entering the excretion hole 30. In the same manner, because the thickness of the floor 27 and the wall 29 can be set to a thickness appropriate for the mouse, it is possible to suppress damages of the floor 27 and the wall 29 even when the floor 27 and the wall 29 are gnawed by the mouse.

Furthermore, according to the first embodiment, even in the environments at least including the space environment, it is possible to set the maximum length of the mouse residential area 20 to a height equal to or more than the recommended height, and to set the floor area of the floor to an area equal to or more than the recommended floor area. Therefore, the mouse can do its daily activities easily, so that it is possible to alleviate the stress imposed on the mouse, and it is possible that to ensure the animal welfare, and to maximize the scientific significance and values.

Furthermore, according to the first embodiment, because it is possible not only to ventilate the mouse residential area 20 but also to remove the excrement by operating the ventilation fan 33, the structure of the apparatus can be simplified. Therefore, it is also possible to reduce the size of the apparatus.

Furthermore, according to the first embodiment, by providing the look-through window 44 to the mouse residential area 20, it is possible, even with the rearing cage unit 13 for rearing the mouse individually, for the mouse to look at the mouse being reared in another rearing cage unit 13. Therefore, it is possible to alleviate the stress of the mouse.

Furthermore, according to the first embodiment, by pushing the food 50 toward the feed opening using the pushing plate 53 and the rotating spring 54, it is possible to feed the food 50 to the mouse automatically.

Furthermore, according to the first embodiment, because the food 50 in the food container 51 can be pushed toward the feed opening 61 by moving the pushing plate 53 in the circumferential direction, the structure of the feeding unit 22 can be reduced in size, and the space occupied by the feeding unit 22 can be reduced.

Furthermore, according to the first embodiment, because a surface treatment is applied to the inner circumferential surface of the supply channel in the washer fluid supplying unit 26, it is possible to improve the drainage of the washer fluid.

Furthermore, according to the first embodiment, because an image of the feed opening 61 and the water feed port can be captured simultaneously using the camera 25, it is possible to capture an image of the mouse eating food and drinking water easily.

Furthermore, according to the first embodiment, by providing the environmental sensor 41, it is possible to get grasp of the environment in the mouse residential area 20 appropriately.

Furthermore, according to the first embodiment, it is possible to rear mouse in the rearing cage unit 13 under an artificial gravity imposed by the gravity imposing apparatus 11. Therefore, it is possible to implement a gravitational environment between 0 G and 1 G, which is not reproducible in the terrestrial environment, over a long time period in the space environment using the gravity imposing apparatus 11.

Second Embodiment

Figure 9:
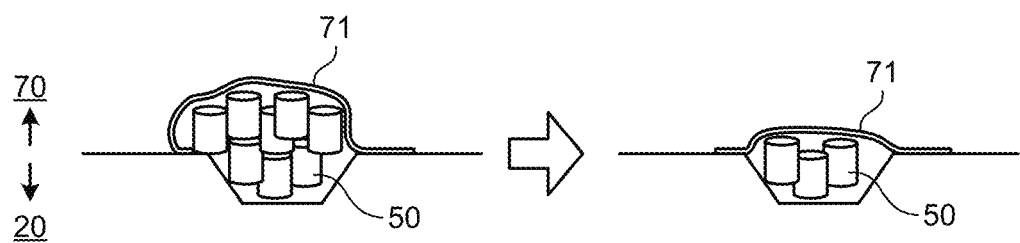
FIG. 9 is a schematic for explaining a feeder according to a second embodiment.

A rearing cage unit 13 according to a second embodiment will now be explained with reference to FIG. 9. In the second embodiment, to avoid redundant explanations, parts that are different from those in the first embodiment will be explained, and the parts that are the same as those in the first embodiment will be explained by appending the same reference signs. FIG. 9 is a schematic for explaining a feeder according to the second embodiment.

A feeder 70 in the rearing cage unit 13 according to the second embodiment is configured to push the food 50 toward the feed opening 61 using an elastic body 71. The elastic body 71 is provided on the outer side of the wall 29, in a manner covering the feed opening 61. The food 50 is then stored inside the elastic body 71.

As described above, in the second embodiment, too, by pushing the food 50 toward the feed opening using the elastic body 71, it is possible to feed the food 50 to the mouse automatically.

Third Embodiment

Figure 10:
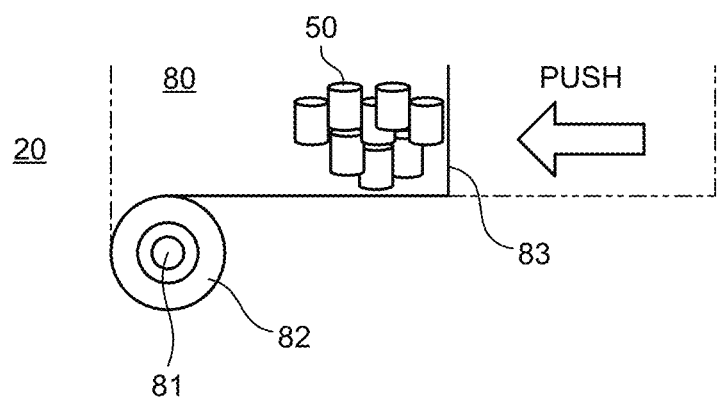
FIG. 10 is a schematic for explaining a feeder according to a third embodiment.

A rearing cage unit 13 according to a third embodiment will now be explained with reference to FIG. 10. In the third embodiment, too, to avoid redundant explanations, parts that are different from those in the first and the second embodiments will be explained, and the parts that are the same as those in the first and the second embodiments will be explained by appending the same reference signs. FIG. 10 is a schematic for explaining a feeder according to the third embodiment.

This feeder 80 in the rearing cage unit 13 according to the third embodiment is configured to push the food 50 toward the feed opening 61 using a constant-load spring 82. Specifically, the feeder 80 includes a support 81, the constant-load spring 82, and a pushing member 83. The support 81 fixes the position of the constant-load spring 82. The pushing member 83 has the food 50 placed thereon, and is connected to the constant-load spring 82. The constant-load spring 82 pushes the food 50 linearly, by pulling the pushing member 83 toward the feed opening 61.

As described above, in the third embodiment, too, by pushing the food 50 toward feed opening using the constant-load spring 82 and the pushing member 83, it is possible to feed the food 50 to the mouse automatically.

Fourth Embodiment

Figure 11:
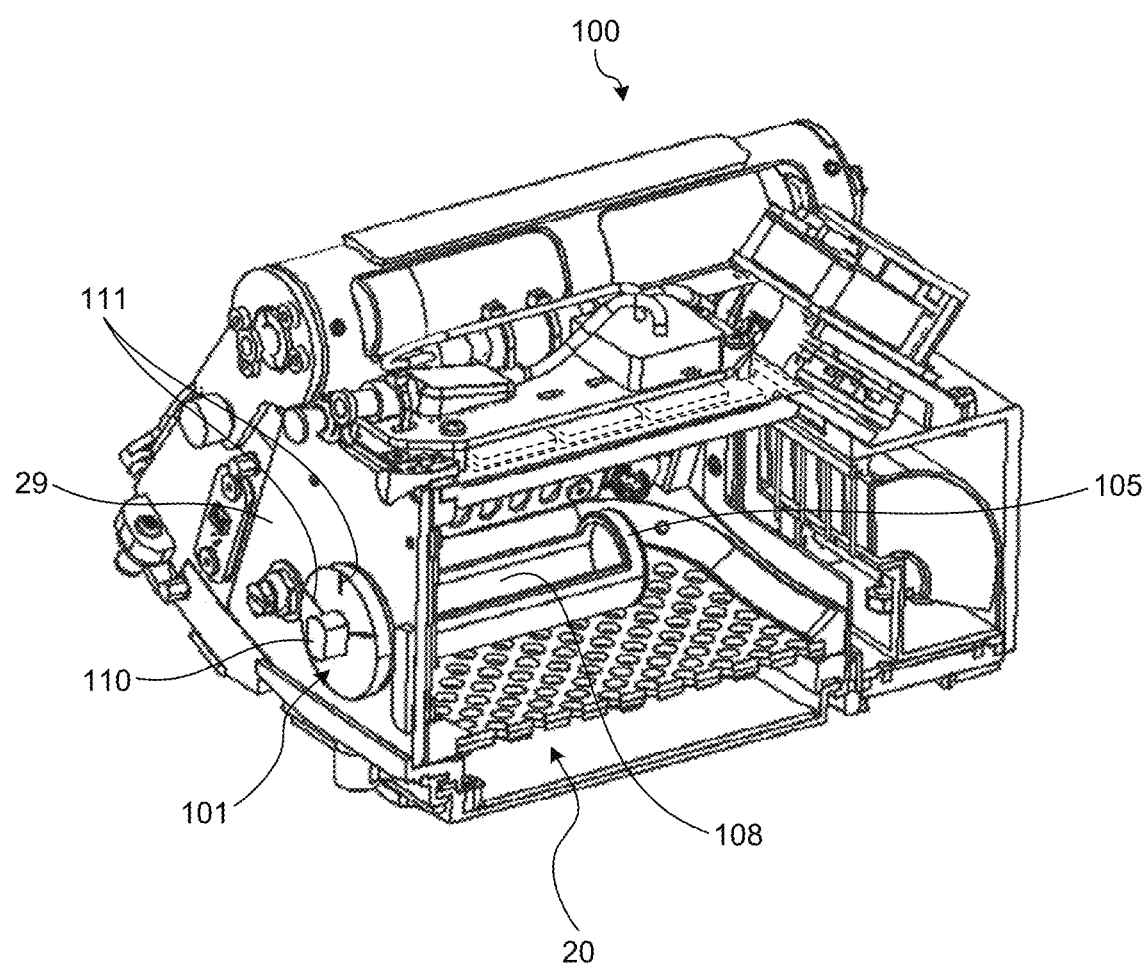
FIG. 11 is a perspective view related to a rearing apparatus according to a fourth embodiment.
Figure 12:
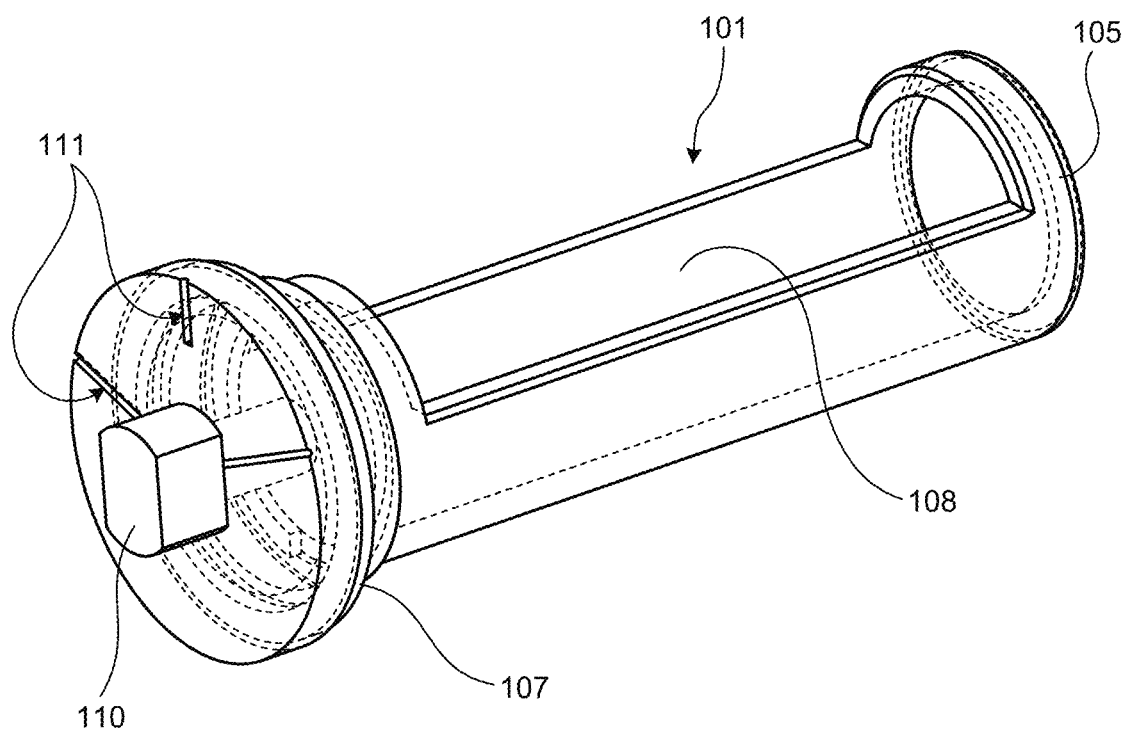
FIG. 12 is a perspective view related to a water replenisher included in the rearing apparatus according to the fourth embodiment.
Figure 13:
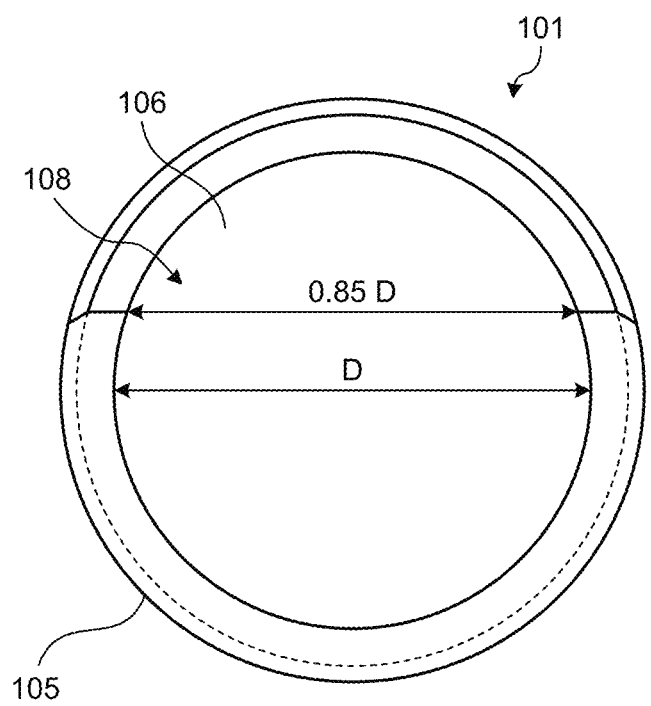
FIG. 13 is a schematic cross-sectional view illustrating the water replenisher.

A rearing cage unit 100 according to a fourth embodiment will now be explained with reference to FIGS. 11 to 13. In the fourth embodiment, too, to avoid redundant explanations, parts that are different from those in the first to the third embodiments will be explained, and the parts that are the same as those in the first to the third embodiment will be explained by appending the same reference signs. FIG. 11 is a perspective view related to a rearing apparatus according to the fourth embodiment. FIG. 12 is a perspective view related to a water replenisher included in the rearing apparatus according to the fourth embodiment. FIG. 13 is a schematic cross-sectional view illustrating the water replenisher.

The rearing cage unit 100 according to the fourth embodiment includes a water replenisher 101, in addition to the elements of the rearing cage unit 13 according to the first embodiment. This water replenisher 101 is to be attached to the mouse residential area 20 to feed water to the mouse when the function of the water supplying unit 23 is lost.

As illustrated in FIG. 11, the water replenisher 101 is attached in such a manner that the water replenisher 101 can be placed inside the mouse residential area 20, and has a cylindrical shape extending in the axial direction along the rotational shaft 14. The water replenisher 101 includes a cylindrical body (replenisher main body) 105, water gel 106, a gasket (sealing member) 107, and an opening 108.

The cylindrical body 105 has one end thereof, in the axial direction, fixed to one of the two walls 29 of the mouse residential area 20, the walls 29 facing each other in the axial direction of the rotational shaft 14. The other end of the cylindrical body 105 in the axial direction is positioned inside the mouse residential area 20. The other end of the cylindrical body 105 positioned inside the mouse residential area 20 is closed, and the one end fixed to the wall 29 extends outwards in the radial direction of the cylindrical body 105. The cylindrical body 105 is attached with the one end thereof, which is fixed to the wall 29, exposed to the external. In other words, the wall 29 has an attachment hole not illustrated for inserting the cylindrical body 105, and the attachment hole is closed with a lid when the water replenisher 101 is not in use. The cylindrical body 105 is rotatable with respect to the wall 29 in the circumferential direction, and the position where the cylindrical body 105 is attached in the circumferential direction can be changed.

The water gel 106 (see FIG. 13) is disposed inside the cylindrical body 105. The water gel 106 is water turned into gel using agar, for example. The mouse can access this water gel 106 via the opening 108 formed on the cylindrical body 105.

The opening 108 is formed by removing a part of the outer circumferential surface of the cylindrical body 105, the part being a part of the cylindrical body 105 positioned inside the mouse residential area 20. When the diameter of the cylindrical body 105 is denoted as D, and an opening width is the length connecting the edges of the opening 108 in the cross section across a plane perpendicular to the axial direction of the cylindrical body 105, as illustrated in FIG. 13, the opening width of the opening 108 is set equal to or less than 0.85 D. The direction of the opening 108 inside the mouse residential area 20 can be adjusted by adjusting the position where the cylindrical body 105 is attached to the wall 29 in the circumferential direction.

The gasket 107 is what is called an O ring, and is provided along the outer circumference of one end of the cylindrical body 105 that is exposed to the external. The gasket 107 is also provided in a manner interposed between the cylindrical body 105 and the wall 29. The gasket 107 ensures airtightness by providing sealing between the cylindrical body 105 and the wall 29 by being squashed against the wall 29, as the cylindrical body 105 is inserted into the inside of the mouse residential area 20.

Provided on an end face of the one end of the cylindrical body 105 exposed to the external are a knob 110 for operating the cylindrical body 105, and markings 111 for visually checking the position where the cylindrical body 105 is attached in the circumferential direction. The knob 110 is provided in a manner protruding to the external from the end face of the one end of the cylindrical body 105, and is manually operable. By rotating the knob 110 in the circumferential direction, it is possible to adjust the position where the cylindrical body 105 is attached in the circumferential direction, and by moving the knob 110 in the axial direction, it is possible to attach or to remove the cylindrical body 105 to and from the rearing cage unit 13. The markings 111 are marks indicating the opening width, and by operating the knob 110 while visually checking the markings 111, it is possible to adjust the direction of the opening 108.

When the water supplying function of the water supplying unit 23 is lost, the water replenisher 101 described above is attached to an attachment hole in such a manner that the one end of the cylindrical body 105 is exposed to the external, by inserting the cylindrical body 105 into the attachment hole on the wall 29 from the external of the mouse residential area 20. At this time, the gasket 107 is nipped between the cylindrical body 105 and the wall 29 so that the space is sealed thereby, and the cylindrical body 105 is rotated in the circumferential direction using the knob 110 to adjust the direction of the opening 108.

As described above, according to the fourth embodiment, by attaching the water replenisher 101 to the wall 29, it is possible to replenish water for the mouse via the water replenisher 101 even when the water supplying function of the water supplying unit 23 is lost, so that the mouse rearing environment can be maintained appropriately. If no water replenishment for the mouse is required, the water replenisher 101 can be removed from the wall 29.

Furthermore, according to the fourth embodiment, by ensuring the air-tightness between the cylindrical body 105 and the wall 29 with the sealing of the gasket 107, the air-tightness of the mouse residential area 20 can be ensured, so that it is possible to suppress water content evaporating from the water gel 106 and escaping from the mouse residential area 20 to the outside, and to suppress drying of the water gel 106.

Furthermore, according to the fourth embodiment, by setting the opening width equal to or less than 0.85 D, it is possible to provide the water gel 106 to the mouse via the opening 108 while ensuring that the water gel 106 is kept inside the cylindrical body 105 without overflowing out of the cylindrical body 105.

Furthermore, according to the fourth embodiment, because the direction of the opening 108 can be changed by changing the position where the cylindrical body 105 is attached in the circumferential direction, it is possible to adjust the direction of the opening 108 in a manner appropriate for the mouse.

REFERENCE SIGNS LIST

Rearing apparatus
11 Gravity imposing apparatus
12 Interface unit
13 Rearing cage unit
14 Rotational shaft
15 Shaft support
16 Flange
17 Control unit
20 Mouse residential area
21 Excrement collection area
22 Feeder
23 Water supplying unit
24 Ventilation unit
25 Camera
26 Washer fluid supplying unit
27 Floor
28 Ceiling
29 Wall
30 Excretion hole
31 Ventilation inlet
32 Ventilation outlet
33 Ventilation fan
34 Deodorization filter
35, 36 Particle filter
41 Environmental sensor
37, 38 Excretion sheet
44 Look-through window
45 Observation window
50 Food
51 Food container
52 Shaft
53 Pushing plate
54 Rotating spring
55 Bars
61 Feed opening
70 Feeder
71 Elastic body
80 Feeder
81 Support
82 Constant-load spring
83 Pushing member
100 Rearing cage unit
101 Water replenisher
105 Cylindrical body
106 Water gel
107 Gasket
108 Opening
110 Knob
111 Markings

The invention claimed is:

1. A rearing cage unit in which an animal is reared individually in an environment at least including a space environment, the rearing cage unit comprising:
an animal residential area defined by a floor, a ceiling, and a wall;
an excrement collection area adjacent to the animal residential area;
an excretion sheet in the excrement collection area to receive excrement of the animal;
a camera configured to capture an image of the animal residential area via an observation surface associated with the animal residential area;
a fluid supplying unit configured to supply washer fluid to the observation surface; and
a wiper configured to wipe the washer fluid on the observation surface;
wherein at least one of the floor and the wall is made of a material including resin, and has an excretion hole to allow the excrement in the animal residential area to be discharged to the excrement collection area, the excretion hole having a size that prevents four feet of the animal from entering the excretion hole,
wherein the excretion sheet is provided facing the excretion hole, and wherein the fluid supplying unit has a supply channel through which the washer fluid is supplied, an inner circumferential surface of the a supply channel being applied with a surface treatment having hydrophobicity to the washer fluid.

2. The rearing cage unit according to claim 1, wherein the floor is curved in a recessed shape toward the excrement collection area.

3. The rearing cage unit according to claim 1, wherein the surface treatment is a first surface treatment, and at least one of the floor and the wall is applied with a second surface treatment for guiding the excrement in the animal residential area into the excrement collection area.

4. The rearing cage unit according to claim 1, wherein;
the animal is a mouse,
the excretion hole is a circular opening having a diameter of 5.0 millimeters ±0.5 millimeters,
the wall is a flat plate having a thickness of 1.0 millimeter to 2.5 millimeters, and
the floor is a flat plate having a thickness of 2.0 millimeters ±0.5 millimeters.

5. The rearing cage unit according to claim 1, wherein;
a maximum length inside the animal residential area is equal to or more than a recommended height, and a floor area of the floor is equal to or more than a recommended floor area,
the recommended height is a height of a terrestrial residential area recommended for the animal that is terrestrially reared in a group, and
the recommended floor area is a floor area of the terrestrial residential area recommended for the animal that is terrestrially reared in the group.

6. The rearing cage unit according to claim 1, further comprising:
a ventilation inlet at the ceiling of the animal residential area;
a ventilation outlet at the excrement collection area; and
a ventilation fan connected to the ventilation outlet,
wherein the ventilation fan operates such that a volume of an airflow travelling from the ventilation inlet to the ventilation outlet is set to a volume by which the excrement in the excrement collection area is carried along the excretion sheet and removed.

7. The rearing cage unit according to claim 1, further comprising a look-through window of the wall, the look-through window being configured to allow an animal being reared in an adjacent rearing cage unit to be looked at.

8. The rearing cage unit according to claim 1, further comprising a replaceable feeder adjacent to the animal residential area with the wall interposed therebetween,
wherein the wall has a feed opening through which food in the feeder is provided to the animal residential area, and
wherein the feeder includes:
a food container in which the food is stored,
a pushing member to push the food stored in the food container toward the feed opening of the wall, and
a biasing member configured to apply a biasing force to the pushing member in a pushing direction of the food.

9. The rearing cage unit according to claim 8, wherein;
the pushing direction is a circumferential direction about a shaft,
the food container extends from the feed opening in the circumferential direction, the pushing member is provided to the food container on a side opposite to where the feed opening is provided in the circumferential direction, in a manner rotatable about the shaft, and
the biasing member is a rotating spring provided to the shaft to move the pushing member about the shaft in the circumferential direction that is the pushing direction.

10. The rearing cage unit according to claim 9, further comprising a water supplying unit in the animal residential area to supply water to the animal,
wherein the wall has a feed opening through which food is fed to the animal in the animal residential area, and
the camera is at a position where the camera is able to capture an image of the feed opening and an image of the water supplying unit.

11. The rearing cage unit according to claim 1, further comprising an environmental sensor configured to collect a measurement of an environment inside the animal residential area.

12. The rearing cage unit according to claim 1, further comprising a water replenisher configured to replenish water in the animal residential area,
wherein the water replenisher is attached removably to the wall that defines the animal residential area.

13. The rearing cage unit according to claim 12, wherein the water replenisher includes;
a replenisher main body to hold water gel inside, the replenisher main body having an opening to enable access to the water gel, and
a sealing member between the replenisher main body and the wall, the sealing member providing sealing between the replenisher main body and the wall to ensure air-tightness.

14. The rearing cage unit according to claim 13, wherein the opening has a size for preventing the water gel held inside the replenisher main body from overflowing to outside of the replenisher main body.

15. The rearing cage unit according to claim 13, wherein a direction of the opening changes depending on a position where the replenisher main body is attached to the wall.

16. A rearing cage unit in which an animal is reared individually in an environment at least including a space environment, the rearing cage unit comprising:
an animal residential area defined by a floor, a ceiling, and a wall;
a camera configured to capture an image of the animal residential area via an observation surface associated with the animal residential area;
a fluid supplying unit configured to supply washer fluid to the observation surface; and
a wiper configured to wipe the washer fluid on the observation surface;
wherein a maximum length inside the animal residential area is equal to or more than a recommended height, and a floor area of the floor is equal to or more than a recommended floor area,
wherein the recommended height is a height of a terrestrial residential area recommended for the animal that is terrestrially reared in a group,
the recommended floor area is a floor area of the terrestrial residential area recommended for the animal that is terrestrially reared in the group, and
wherein the fluid supplying unit has a supply channel through which the washer fluid is supplied, an inner circumferential surface of the a supply channel being applied with a surface treatment having hydrophobicity to the washer fluid.

17. A rearing cage unit in which an animal is reared individually in an environment at least including a space environment, the rearing cage unit comprising:
- an animal residential area defined by a floor, a ceiling, and a wall;
- an excrement collection area adjacent to the animal residential area with the floor interposed therebetween;
- an excretion sheet in the excrement collection area, the excretion sheet being configured to receive excrement of the animal;
- a ventilation inlet at the ceiling of the animal residential area;
- a ventilation outlet at the excrement collection area;
- a ventilation fan connected to the ventilation outlet;
- a camera configured to capture an image of the animal residential area via an observation surface associated with the animal residential area;
- a fluid supplying unit configured to supply washer fluid to the observation surface; and
- a wiper configured to wipe the washer fluid on the observation surface;
- wherein the floor has an excretion hole to allow the excrement in the animal residential area to be discharged to the excrement collection area, the excretion hole having a size that prevents four feet of the animal from entering the excretion hole,
- wherein the excretion sheet is facing the excretion hole,
- wherein the ventilation fan operates such that a volume of an airflow travelling from the ventilation inlet to the ventilation outlet is set to a volume by which the excrement in the excrement collection area is carried along the excretion sheet and removed, and
- wherein the fluid supplying unit has a supply channel through which the washer fluid is supplied, an inner circumferential surface of the a supply channel being applied with a surface treatment having hydrophobicity to the washer fluid.

18. A rearing apparatus comprising:
- a gravity imposing apparatus configured to impose an artificial gravity to the rearing cage unit; and
- an interface unit connecting the rearing cage unit to the gravity imposing apparatus, and to which a plurality of rearing cage units each configured according to claim 1 is attached.

19. The rearing apparatus according to claim 18, wherein;
- the rearing cage units are side by side in a circumferential direction about a rotational shaft, and
- two of the rearing cage units adjacent in the circumferential direction are configured to be axially symmetric to each other.

\* \* \* \* \*